United States Patent
Kapp et al.

(10) Patent No.: US 7,363,834 B2
(45) Date of Patent: Apr. 29, 2008

(54) SHIFT DRUM HAVING AN INSERTION-GROOVE FLANK MOVABLE AXIALLY WITH RESPECT TO A SHIFT DRUM AXIS AND SHIFTING METHOD

(75) Inventors: Stefan Kapp, Walheim (DE); Stephan Bungart, Remscheid (DE); Reinhard Schaarschmidt, Illingen (DE)

(73) Assignee: GETRAG Getriebe- und Zahnradfabrik Herman Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/454,611

(22) Filed: Jun. 16, 2006

(65) Prior Publication Data
US 2007/0000340 A1  Jan. 4, 2007

Related U.S. Application Data

(63) Continuation of application No. PCT/EP2004/013400, filed on Nov. 26, 2004.

(30) Foreign Application Priority Data
Dec. 17, 2003  (DE) ................. 103 61 356

(51) Int. Cl.
*F16H 59/00* (2006.01)
*F16H 61/00* (2006.01)
*F16H 63/00* (2006.01)

(52) U.S. Cl. .................................... 74/337.5
(58) Field of Classification Search ........... 74/335, 74/337.5
See application file for complete search history.

(56) References Cited

U.S. PATENT DOCUMENTS 6,003,649 A * 12/1999 Fischer et al. ............. 192/3.58
6,220,109 B1 * 4/2001 Fischer et al. ............. 74/337.5

FOREIGN PATENT DOCUMENTS

| DE | 195 43 645 A1 | 11/1995 |
| DE | 198 45 604 C1 | 10/1998 |
| DE | 199 08 602 A1 | 2/1999 |
| DE | 199 24 335 A1 | 5/1999 |
| DE | 101 28 854 A1 | 6/2001 |
| DE | 102 03 633 | 1/2002 |
| EP | 1 333 201 A2 | 8/2003 |
| JP | 63053342 A | 3/1988 |

OTHER PUBLICATIONS

International Preliminary Report on Patentability dated Sep. 8, 2006.

* cited by examiner

*Primary Examiner*—Tisha Lewis
(74) *Attorney, Agent, or Firm*—Knobbe, Martens, Olson & Bear LLP

(57) ABSTRACT

Shift drum (10; 10') for a multi-step transmission of a motor vehicle, with at least one circumferential track (14, 16), in particular circumferential groove (14, 16), into which at least one axially displaceable track follower (S, T) can engage, the circumferential track (14, 16) having flanks (22, 24) along which the track follower (S, T) is guided, characterized in that one of the flanks (22) has a portion (26) which is mounted so as to be movable axially out of a normal position against a restoring force ($F_R$).

19 Claims, 4 Drawing Sheets

SHIFT DRUM HAVING AN INSERTION-GROOVE FLANK MOVABLE AXIALLY WITH RESPECT TO A SHIFT DRUM AXIS AND SHIFTING METHOD

CROSS-REFERENCE TO RELATED APPLICATIONS

This is a continuation application of co-pending International Patent Application PCT/EP2004/013400 filed Nov. 26, 2004 (WO 2005/059410 A1) which, in turn, claims priority of German Patent Application DE 103 61 536.0 filed on Dec. 17, 2003, which is fully incorporated by reference herewith.

BACKGROUND OF THE INVENTION

1. Field of the Invention

The present invention relates to a method for preloading a gear to be disengaged in a multi-step transmission of a motor vehicle and to a shift drum for a multi-step transmission of a motor vehicle, having at least one circumferential track, in particular a circumferential groove into which at least one axially displaceable track follower can engage, the circumferential track having flanks on which the track follower is guided.

The present invention relates, furthermore, to a shift drum-controlled multi-step transmission for motor vehicles and to a method for preloading a gear of a multi-step transmission to be disengaged.

2. Description of the Related Art

Such a shift drum and such a method are known from DE 199 24 335 A1.

In automatically shifting multi-step transmissions for motor vehicles, a distinction is made between two fundamental concepts. One concept is a combination of load planetary gear units and hydrodynamic converters. Particularly because of the hydrodynamic converter, the efficiency of such transmissions is not especially favourable. The second concept, which has increasingly been adopted in recent times, is based on an arrangement of a conventional manually-shifted transmission and of a conventional starting and separating clutch in the form of a friction clutch. Instead of these elements being actuated by the driver by means of a clutch pedal and shift lever, corresponding actuators are provided, which, in order to change gears, are activated in a mutually coordinated way as a function of an superordinated shift strategy.

In the manually-shifted transmissions designed as multi-step transmissions of the transfer box gearing type, when the gear is changed there is a collapse in traction force between the time point of disengaging a gear and the time point of engaging a new gear, since the friction clutch assigned to the multi-step transmission is opened in this case. The engine is, in this case, decoupled from the transmission and therefore also from the driving wheels.

In automated multi-step transmissions, the gear change itself is caused, for example, by means of one or more shift drums. These shift drums are suitable for sequential actuation of shift transmissions.

The shift drums are driven by means of an actuating drive, such as, for example, a motor, in particular an electric motor. For example, a pin-shaped groove follower, which is also designated as a shift pin, is guided in at least one guide or control groove of the rotatable shift drum. The shift pin is mounted axially displaceable with respect to the axis of rotation of the shift drum and connected to an actuator (shift fork, synchronizing unit, shift sleeves and the like) of the assigned transmission. If, then, a gear which is coupled to the pin is to be shifted, the shift drum and therefore also the control groove are rotated with the aid of the electric motor. The control groove has curved regions, also called shift teeth or shift cams, by means of which the shift pin is offset axially. In these curved regions, the control groove, normally running straight in the circumferential direction, is offset in the axial direction.

A plurality of shift pins assigned to various gears can be guided in the control groove. A single shift pin may, if appropriate, even be assigned to a plurality of gears, namely in such a way that an axial displacement of the shift pin out of a neutral position into a first axial direction engages a gear and an axial displacement of the pin out of the neutral position into the opposite axial direction engages another gear.

In the prior art, various proposals have been made as to how the predetermined sequential shift sequence can be avoided in a shift drum of this type. Thus, it is known per se to bring the shift pin out of engagement with the control groove by means of a radial movement of the control groove, i.e. perpendicularly with respect to the axis of the shift drum. This allows a shift tooth of the shift drum to move past under the engagement end of the shift pin, without causing an axial displacement of the shift pin.

In order to jump gears during a shift operation, it is known, furthermore, to provide shift grooves being widened in portions and to mount the shift drum, overall, so as to be axially displaceable such that shift teeth can be moved past the shift pin, without actuating the shift pin axially. Instead of the shift groove being widened only in portions, the shift groove may also be widened, overall, in the axial direction, in which case the groove width should be at least equal to the pin width plus the shift width, such that by axially displacing the shift drum by a distance corresponding to the shift width, the shift tooth or a plurality of shift teeth can be shifted effectively or shifted ineffectively.

If the width of the control groove significantly exceeds the width of the groove follower or of the shift pin, the groove follower (shift pin), at least in regions, is not guided in the control groove in both axial directions.

Instead of a widened control groove, DE 101 28 854 A1 proposes what is known as a bypass control groove, in which the shift pin can be moved past the shift tooth, without the shift pin being adjusted in the axial direction. That is to say, the control groove is simply continued rectilinearly, the control tooth constituting a branch with respect to the rectilinear control groove.

In order to influence the path which the shift pin has to take, a switch is provided. The switch is a guide part displaceable in the axial direction. In a first axial position, the switch steers a shift pin into the track of the shift tooth. In the second axial position different from the first shift position, the switch steers the shift pin into the bypass track, so that it is possible, in a sequential shift sequence, to jump a gear assigned to the switch. The axial displaceability of the switch thus serves for jumping gears in a sequential order.

In DE 195 43 645 A1, the shift drum itself is displaced axially, in order to jump gears in a sequential order.

DE 198 45 604 C1 discloses a method for disengaging a gear of a multi-step transmission.

Therein, a drive train likewise comprises a friction clutch and a multi-step transmission. The multi-step transmission transfers the power of an engine of a motor vehicle from a transmission input shaft to a transmission output shaft. The multi-step transmission is designed in a way known per se as a countershaft transmission and possesses a countershaft. The transmission comprises a plurality of wheel sets. Between the wheel sets, the transmission output shaft has arranged thereon a shift clutch formed with a synchronizing device, for the form-closed engagement and disengagement of the gears.

When a gear is being engaged, the synchronizing device is capable of reducing differential rotational speeds between the transmission output shaft and the gearwheel to be connected to the latter to zero and therefore of synchronizing the two transmission components.

In response to a gear-change requirement signal, which is triggered in a manual-shift mode, for example, by the actuation of a shift lever, but, in an automatic mode, is triggered independently by a central control, a lowering of the engine power first takes place, for example by gradually closing a throttle valve or regulating the injection quantity correspondingly.

Somewhat temporal offset and otherwise in parallel therewith, the clutch is actuated, so that the friction clutch is moved gradually from a completely closed position towards a completely opened position. During this movement, the friction clutch passes through what is known as a slip point. Up to the slip point, the friction clutch does not yet slip, and the rotational speeds of the engine and transmission shafts are identical. Beyond the slip point, the friction clutch begins to slip. A rotational-speed difference between the engine shaft and transmission input shaft occurs.

Furthermore, after the detection of the gear-change requirement signal, an activation signal for preloading the engaged gear is generated by the transmission control. The activation signal gradually rises and remains at a final value up to a time point at which the shift clutch is moved towards the open position.

Due to the gradual rise of the activation signal, the force acting on the shift clutch by means of the transmission actuator is gradually increased in the manner of a pretension.

It is to be noted that the force necessary for moving the shift clutch from the closed position into the open position depends on how high the load is which is transferred in the shift position or on how high the corresponding torque is. As long as a torque is transferred from the transmission input shaft, the shift clutch is "braced" circumferentially in the shift position on account of the positive engagement at the synchronizing device. This positive engagement may be enhanced by what is known as an undercut and by a draw-in effect which thus comes into action.

Due to the preloading of the shift clutch of the gear to be disengaged, it may happen that, because of the engine torque decrease introduced, the torque transferred from the transmission input shaft, although not yet being zero, has nevertheless reached a value such that the size of the pretension (force) exerted on the synchronizing device by the transmission actuator is correspondingly sufficient to move the shift clutch into the open position. The time of an interruption in traction force can be shortened thereby.

Systems or transmissions of this type with traction force assistance (for example, DE 199 08 602 A1), generally require a decoupling of the disengagement of the source gear and engagement of the target gear. In shift drum-actuated transmissions, this is generally possible only when two or more shift drums are provided.

The problem, on which the invention is based, is to specify an improved shift drum or an improved shift drum-actuated transmission and an improved shifting method (with preloading of the source gear), whereinin particular the control of preloading is facilitated.

SUMMARY OF THE INVENTION

This object is achieved by means of a shift drum as mentioned at the outset, wherein one of the flanks has a portion which is mounted so as to be movable axially out of a normal position against a restoring force.

The object is achieved, furthermore, by means of an automated shift transmission having a shift drum of this type.

This object is achieved, furthermore, by means of a method in which a shift drum of the multi-step transmission is rotated, the shift drum having at least one circumferential track, in particular circumferential groove, into which at least one axially displaceable track follower engages, the circumferential track having flanks along which the track follower is guided, and wherein one of the flanks has a portion which is mounted so as to be movable out of a normal position against a restoring force, and the movably mounted flank portion is moved in the axial direction against the restoring force as a result of the rotation of the shift drum when the said flank portion is supported against the track follower.

Since one flank of the circumferential track has a movable portion which is mounted so as to be movable out of a normal position against a restoring force, a pretension which allows a quicker disengagement of a gear to be disengaged can be achieved in a simple way.

The term "movable portion" is understood in the present context to mean preferably a portion of the flank in the circumferential direction which extends over an angle of markedly less than 180°, in particular of less than 90° and contains one or more functional portions of the circumferential track.

The shift drum according to the present invention simplifies the preloading of the gear to be disengaged in that the preload operation is decoupled from the rotation of the shift drum. Furthermore, the disengagement of the gear to be disengaged is also decoupled from the engagement of the gear to be engaged.

The shift drum may have a single such flank portion which is assigned to a specific gear. Alternatively, a plurality of or all the gears of the transmission are assigned such a movable flank portion.

According to a preferred embodiment, the restoring force increases with an increasing axial movement of the movably mounted flank portion out of the normal position.

By this measure a gradually build-up of the pretension required for disengaging the gear is achieved. The force provided for disengaging the gear becomes ever higher with an increasing rotation of the shift drum.

It is advantageous, further, if, in the normal position, the flank portion projects with respect to its assigned flank.

What is achieved by this offset is that, during a movement of the track follower, the flank portion is deflected axially in the circumferential direction.

According to a further preferred embodiment, the track has at least one shift tooth, by means of which a change of a gear of the transmission can be caused, the movably mounted flank portion being arranged, in spatial terms, essentially in the region of the shift tooth.

The required pretension is thus built up whenever a gear change is about to be performed. The pretension is not maintained for an unnecessarily long period, but, in terms of time, is built up only shortly before a shift operation occurs, and is subsequently also reduced again quickly. This protects both the flanks of the element which has the movable flank portion against wear, but, above all, also the shift fork and shift sleeve.

Moreover, it is advantageous if the movably mounted flank portion is in the form of a shift tooth flank.

What is meant by this is that the shift tooth is of a ramp-like design and has no steps or the like which have to be overcome by the track follower.

The form of a conventional shift-toothed flank is formed, as is known, such that the shift drum and the track follower connected to the latter are subjected to as little stress as possible. This advantage is utilized in the movably mounted flank portion.

According to a preferred embodiment, a flank portion of the circumferential track, said flank portion following the movably mounted flank portion in the shift direction, is formed as an ejection portion.

The provision of an ejection portion ensures that two gears are not inadvertently engaged simultaneously, to be precise, for example, the non-disengaged source gear and the already engaged target gear, which would lead to serious damage to the transmission as a whole. The ejection portion thus constitutes a safeguard against a malfunction of the movably mounted flank portion.

It is particularly preferred if the circumferential track is widened in the axial direction in the region of the movably mounted flank portion.

The widening of the circumferential track in the axial direction allows the movably mounted flank portion to move the track follower in the axial direction when there is a sufficiently accumulated restoring force. This movement may take place at any time and is therefore independent of the orientation of the track follower with respect to the shift drum position in the circumferential direction. As soon as the required restoring force is built up, the track follower can be changed over, that is to say the gear to be disengaged is disengaged. The faster a gear to be disengaged is disengaged, the sooner a gear to be engaged can be engaged, so that the entire shift time in the event of a gear change can be reduced considerably.

It is also advantageous if the movably mounted flank portion is assigned to a slide which, in turn, is assigned to means for generating the restoring force.

A slide within the meaning of the present invention is an element mounted axially displaceable on the shift drum. This element can simply be connected to the means for generating the restoring force. This ensures that the track follower is moved when there is a sufficiently accumulated restoring force, i.e. the gear to be disengaged is disengaged.

According to a further embodiment, the means for generating the restoring force have a spring, in particular the spring constant of the spring being engaged such that the spring can absorb at least the force which is required for the axial movement of the track follower, in order to disengage the assigned engaged gear of the transmission, in particular under part-load.

By using a spring, the preloading force can be adapted via the choice of the spring constant. Since not every gear requires the same preloading force in order to be disengaged, this constitutes a suitable means for adapting the respective preloading force. Any desired spring characteristic curves may be employed, for example linear and degressive/progressive characteristic curve profiles.

It is particularly preferred if the means for generating the restoring force are a spring damping system which generates restoring forces of different size as a function of the shift time.

The shorter the shift time is to be, the higher the restoring force can be set. Thus, for example, the spring could already be preloaded in the normal position, so that only a slight deflection of the movably mounted flank portion in the axial direction is necessary in order to reach the threshold value of the desired pretension or restoring force.

It is preferred, furthermore, if the means for generating the restoring force are provided within the shift drum.

When the means for generating the restoring force are located within the shift drum, these are arranged so as to be protected against contamination. The abrasion possibly occurring between the shift drum and the track follower during shifting cannot damage the means for generating the restoring force.

Alternatively, it is advantageous if the means for generating the restoring force are provided outside the shift drum.

In this case, the means for generating the restoring force can be exchanged in a simple way. Servicing, checking and repair work can also be carried out in a simple way due to the easy accessibility.

According to a further preferred embodiment, the restoring force can be actively regulated via a further control element.

The pretension force can thereby be set during the shift operation as a function of the situation or according to a predetermined control mode (ECO/sport).

A further advantage is to be seen in that the movably mounted flank portion has a plateau region.

The plateau preferably follows a ramp portion and serves generally for the compensation of tolerances. Due to wear, for example of the conical friction device or of the synchronizing device, the position of the synchronizing point of a target gear may vary. The position of the synchronizing point of the target gear may likewise vary due to different synchronizing or pressure forces. The plateau region, i.e. a flank portion formed rectilinearly in the circumferential direction, ensures that the restoring force can be kept constant over a lengthy period of time while the drum, in particular, is rotating in the shift direction.

Moreover, it is preferred if the movably mounted flank portion is formed such that, at the latest when a gear to be engaged reaches its synchronizing point, the restoring force at the gear to be disengaged is sufficiently high to disengage this.

Furthermore, it is preferred if the movably mounted flank portion is formed such that it is partially bevelled in the axial direction or is formed as a ramp.

The partial bevelling of the flank portion in the axial direction ensures that the rotational movement of the shift drum in the circumferential direction effects, via the track follower, a gradually building-up force component in the axial direction on the flank portion.

Furthermore, it has proved advantageous if the axial movement out of the normal position is directed away from the track.

It is advantageous, further, if the ejection portion is arranged in the region of the shift tooth.

According to further preferred embodiment, the further control element regulates the restoring force mechanically, electrically, pneumatically and/or hydraulically.

It is preferred, furthermore, if the track follower is a sliding block or a roll.

Moreover, it is advantageous if the movably mounted flank portion is provided on the flank on which the track follower is guided during the disengagement of the gear of a transmission.

According to a further preferred embodiment, the movably mounted flank portion is mounted such that it can be displaced axially at least by the amount of the disengagement travel of a gear to be disengaged.

Furthermore, it is preferred if the shift drum is designed for a single-drum system or a shift drum system with a sequential gear succession on a single shift drum.

It is also preferred if the track follower is coupled to an actuator, in particular a shift sleeve, of the transmission.

It should be appreciated that the features mentioned above and those yet to be explained below can be used not only in the combination specified in each case, but also in other combinations or alone, without departing from the scope of the present invention.

BRIEF DESCRIPTION OF THE DRAWINGS

Further objects, features and advantages will become even clearer from the following description, in conjunction with the accompanying drawings, in which.

DETAILED DESCRIPTION OF THE PREFERRED EMBODIMENTS

Figure 1:
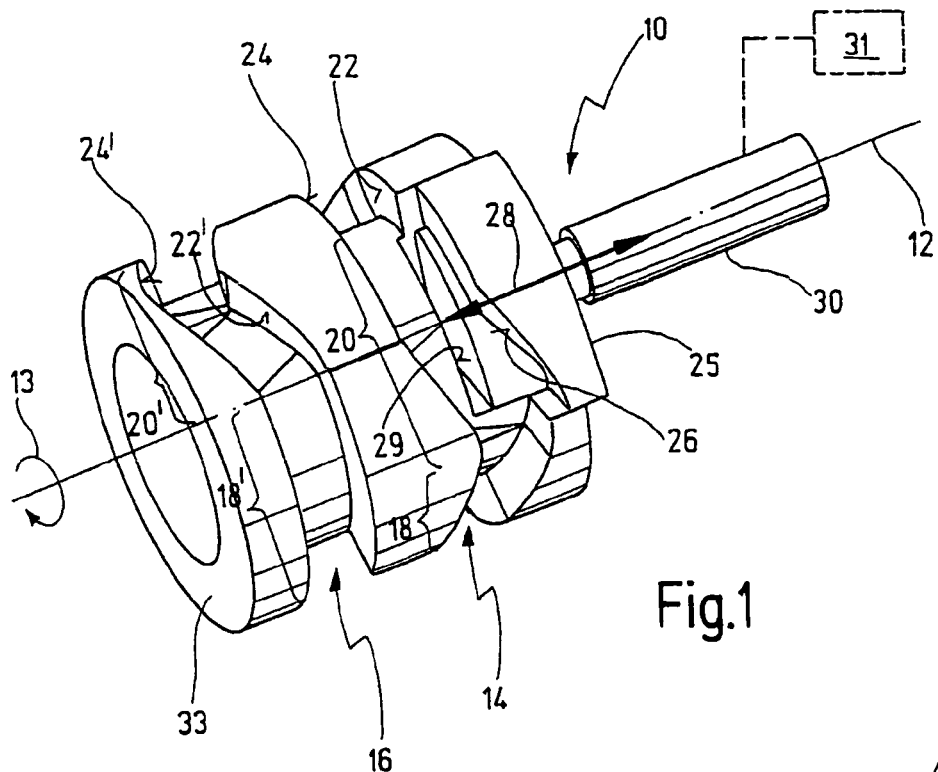
FIG. 1 shows a diagrammatic perspective view of a shift drum according to the first embodiment of the present invention.

In FIG. 1, a first embodiment of a shift drum is designated in general by 10. The shift drum forms part of a shift arrangement, not illustrated, of an automated step transmission for motor vehicles.

The shift drum 10 has a longitudinal axis 12, about which the shift drum 10 is mounted rotatably. The shift drum 10 is rotated in the direction of the arrow 13, in order, for example, to shift from a low gear into a next higher gear. In this case, the lower gear is first disengaged and the higher gear is subsequently engaged.

The shift drum 10 has a first circumferential track 14, which is illustrated on the right in FIG. 1, and a second circumferential track 16, which is illustrated on the left in FIG. 1. The circumferential tracks 14 and 16 respectively are formed in the shape of a circumferential groove, into each of which a so-called track follower (not illustrated) can engage. The track followers used may be, inter alia, so-called groove followers, shift pins, sliding blocks, rolls, etc. The circumferential tracks could also be formed inversely, i.e. the circumferential tracks would then have the shape of projections or protuberances. The groove follower or groove followers could then, for example, have the shape of a fork surrounding the projections respectively in order to be guided.

The track followers, not illustrated in FIG. 1, are coupled to actuators, in particular shift sleeves, of the step transmission. So that a gear of the transmission can be engaged or disengaged, the actuator, and therefore also the track follower, must be moved in an axial direction (cf. arrow 28 of FIG. 1) of the shift drum 10. The axial movement of the actuator has the effect that, for example, a loose wheel, as it is known, is connected rotationally fixed to a transmission shaft or is released from the latter.

FIG. 1 illustrates the circumferential tracks 14 and 16 having straight portions 18 and 18' and portions 20 and 20' which have so-called shift teeth. The shift teeth 20, 20' cause a movement of a track follower in the axial direction, i.e. a gear is engaged or disengaged. The straight portions 18, 18' of the circumferential tracks 14, 16 correspond to static shift positions in which no gears are shifted. In a straight portion 18, 18' of the circumferential tracks 14, 16, the corresponding gear remains either engaged or disengaged.

In order to cause a gear change, the shift drum 10 is rotated to the corresponding direction.

In the exemplary embodiment shown in FIG. 1, the first circumferential track 14 could serve, for example, for engaging and disengaging the first gear of a transmission. The second circumferential track 16 could serve for engaging and disengaging the second gear.

The shift tooth 20, as can be seen in FIG. 1, of the first circumferential track 14 starts in front of the shift tooth 20' of the second circumferential track 16 in the direction of rotation 13.

Thus, the first gear, which is also called the source gear or start gear, is disengaged first. The second gear, which is also called the target gear, is engaged subsequently.

To change the gears, the corresponding groove followers, which are not illustrated in FIG. 1, are guided in the associated circumferential tracks along the shift teeth. The track followers are guided via lateral flanks of the circumferential track. The first circumferential track 14 has a first flank 22, which is illustrated on the right in the view of FIG. 1, and a second flank 24. The second circumferential track 16 similarly has a first flank 22' and a second flank 24'.

The first circumferential track 14 has, in the region 20 of the shift tooth, a slide 25 mounted displaceably in the axial direction 28. The slide 25 has a flank portion 26 which preferably has the shape of a shift-tooth flank, a circumferentially formed part of the flank portion 26 ensuring a restoring force constantly acting on the slide 25 while the drum is moving in the direction of the arrow 13. In the normal position, the slide 25 lies against a stop face 29 of a body 33 of the shift drum 10. The slide 25 is coupled with a device 30 for generating a restoring force.

The device 30 for generating the restoring force may have, for example, a spring (not illustrated) which can be compressed in the axial direction 28. In a normal position of the slide 25, the spring is preferably relaxed or only slightly preloaded. In the event of an axial movement of a slide 25 away from the circumferential track 14, the spring is tensioned, whereby a restoring force acting along the axial direction 28 is generated.

An actively regulatable control element 31 may also be used, by means of which the stroke, stroke speed and force of the slide 25 are controlled.

Figure 2:
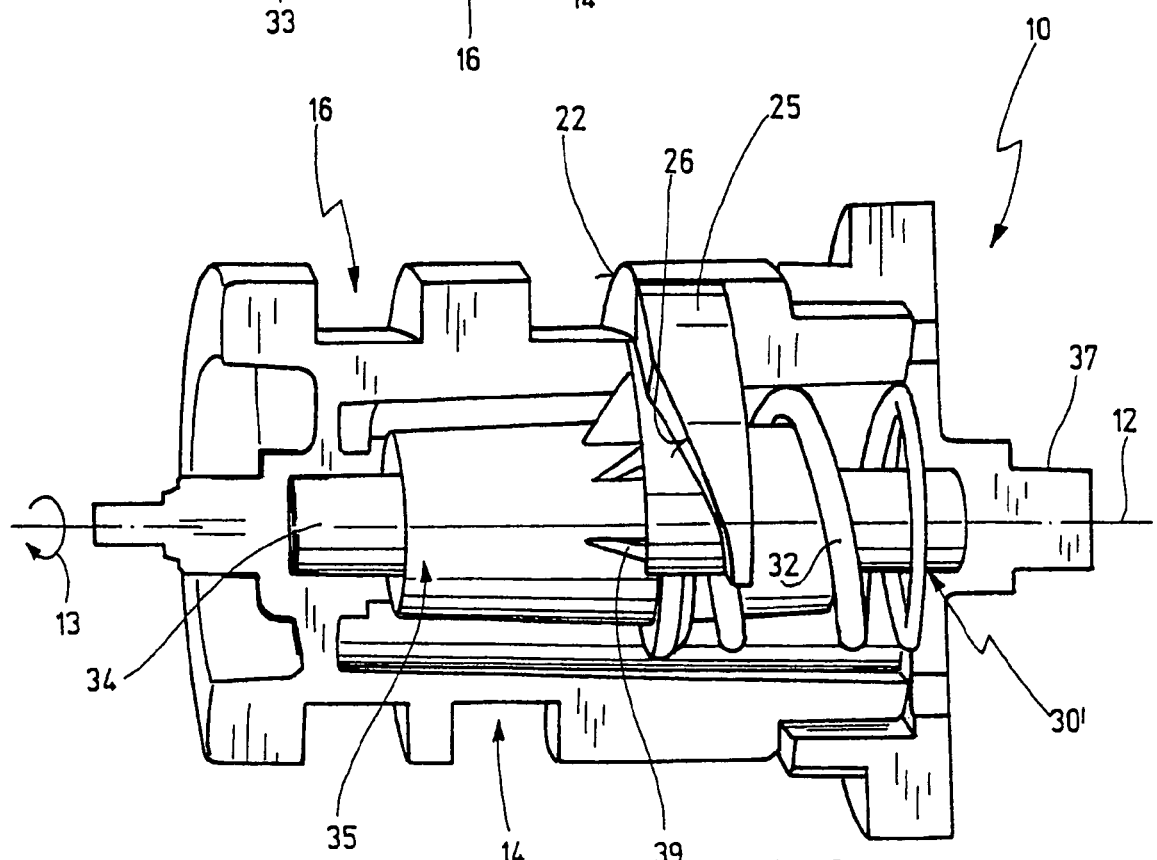
FIG. 2 shows diagrammatically shift drum according to a further embodiment of the present invention.

FIG. 2 shows a further embodiment of a shift drum 10' according to the present invention. The shift drum 10' is illustrated in section in order to obtain a view into the interior of the shift drum 10'.

Features identical to those features shown in FIG. 1 are designated by the same reference numerals.

The means 30' in the form of a compression spring 32 for generating the restoring force are arranged here, in contrast to FIG. 1, in a cavity 35 within the housing 33 of the shift drum 10'. The slide 25 has a bush which is mounted axially movable on a guide axle 34. The flank portion 26 is connected to the bush via a radial projection 39. Furthermore, the shift drum 10' has, at one axial end, a cover 37 which is oriented perpendicularly with respect to the longitudinal axis 12 and which closes the cavity 35.

A compression spring 32, for example in the form of helical spring, is arranged between the cover 37 and the radial projections 39. In the illustration of FIG. 2, the slide 25 is in its normal position, i.e. lies against the stop face 29 (cf. FIG. 1). In this position, the spring 32 is preloaded by a certain amount.

When the slide 25 is moved axially in the direction of the cover 37, the spring 32 is tensioned. Since the cover 37 is fixed to the housing 33 of the shift drum 10', a restoring force builds up which is directed along the longitudinal axis 12 away from the cover 37. This restoring force endeavours to force the slide 25 back into the normal position.

FIGS. 3a to 3e show various phases of a diagrammatic shift operation according to the present invention, in which the gear to be disengaged is preloaded by means of a shift drum according to the present invention, in particular the shift drums 10, 10' of FIGS. 1 and 2.

In FIGS. 3a to 3e, the circular outer surface area of the shift drum 10 or 10' is projected onto a plane surface. The arrow 13' corresponds to the direction of rotation 13 of FIG. 1.

Furthermore, FIGS. 3a to 3e illustrate two track followers S and T. The track follower S follows the circumferential track 14 and is assigned to the start gear to be disengaged. The track follower T follows the circumferential track 16 and is assigned to the target gear to be engaged. To simplify the illustration, the shift drum does not move, but, instead, the track followers T and S move in the direction opposite to the arrow 13'.

Figure 3A:
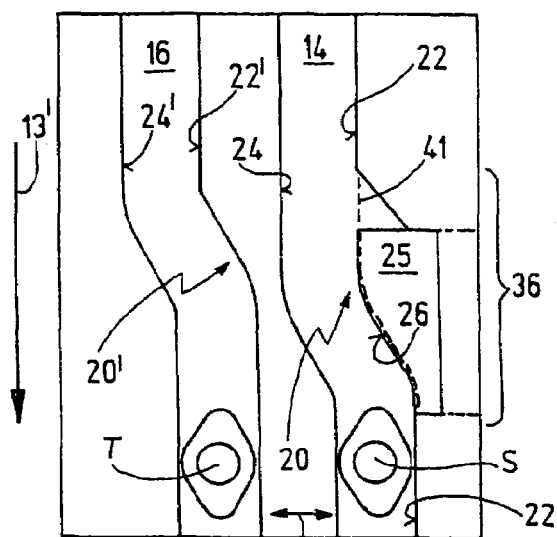
FIGS. 3a-3e show the sequence of a diagrammatic shift operation, in which selected start and source gears, respectively, are disengaged and a disengaged target gear is selected.

FIG. 3a illustrates the situation when the start gear is engaged and the target gear is disengaged. In response to a shift signal (not illustrated), the shift drum according to the invention is rotated in the direction of the arrow 13'. The shift tooth 20 of the start gear begins spatially in front of the shift tooth 20' of the target gear (in the direction of rotation).

The shape of a flank 22 of the circumferential track 14, such as would be found in the prior art, is illustrated with the aid of a broken line 41. According to the prior art, the flank 22 would be continued along the broken line 41 in order to merge into a static flank portion 26 which, however, in the present invention, is mounted movably. Here, also, the shift tooth 20 of the circumferential track 14 would be arranged spatially in front of the shift tooth 20' of the circumferential track 16. This ensures that a disengagement temporally before an engagement is ensured during the rotation of the drum in the direction of the arrow 13'. To be precise, the right-hand flank of the circumferential track 14 would then include a continuous part without a movably mounted flank 26. In the event of a rotation of the shift drum along the direction of the arrow 13', the track follower S would be moved to the left in FIG. 3a by the static flank 26, resulting in a disengagement. The track follower T of the target gear would thereafter cause an engagement of the target gear due to the shift tooth 20'.

In this case, the system described in the invention, in particular the spring, can be formed such that a shift sequence according to the prior art, i.e. with a completely opened main clutch without a preloading of the start gear, is likewise possible.

According to the present invention, however, a slide 25 mounted movably in the axial direction is provided in a region 36 of the shift tooth. The region 36 comprises the shift tooth 20 and parts of the circumferential track 14 which directly follow the shift tooth 20. During a rotation of the shift drum in the direction of the arrow 13', the track follower S is therefore guided along the flank 22 of the first circumferential track 14 in the direction of the movably mounted flank portion 26 of the slide 25.

Figure 3B:
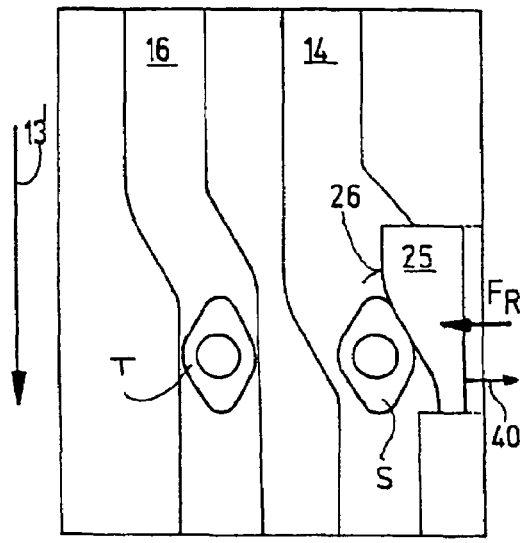
Figure 3C:
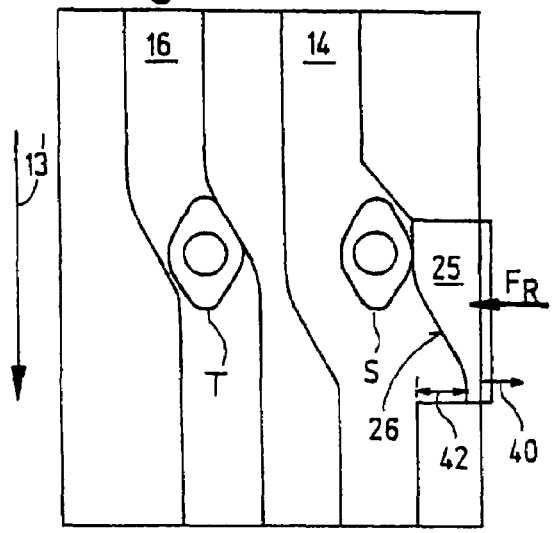

By providing the slide 25 the track 14 widens effectively (cf. also FIG. 3c).

In FIG. 3b, the shift drum has already rotated in the direction of the arrow 13' to an extent such that the track follower S touches the flank portion 26 of the slide 25. Since the start gear is still acted upon by a (residual) torque, the start gear is held via a toothing of the clutch body and of the shift sleeve. This means that the track follower S (still) cannot move to the left, i.e. into its neutral position in FIG. 3b. The result of this, furthermore, is that the track follower S maintains its original axial position and therefore moves the slide 25 in the direction of an arrow 40.

The arrow 40 is oriented away from the circumferential track 14 in the axial direction, i.e. to the right in FIG. 3b. As a result of the axial movement of the slide 25, a restoring force $F_R$ builds up, which is oriented in the direction opposite to the arrow 40. This restoring force $F_R$ effects the pretension force.

In FIG. 3c, the shift drum according to the present invention has been rotated even further in the direction of the arrow 13'. During rotation, the slide 25, due to its ramp-like configuration and the movement of the track follower S in the circumferential direction, has been moved even further in the axial direction 40. This results in an even higher restoring force $F_R$. The track follower S has displaced the slide 25 over the entire disengagement travel 42. The energy accumulated in the spring is then at maximum and corresponds at least to the restoring or pretension force required for disengaging the start gear.

The track follower T of the target gear has moved axially in the track 16 in the direction opposite to the direction 40, i.e. in the direction of the frictional position (synchronizing point) of the synchronizing device coupled to the track follower T. Since this position will be displaced in the direction opposite to the direction 40 as a result of wear in the synchronizing device, the slide 25 has in this region formed thereon a circumferentially rectilinear part of the flank portion 26 which in this region exerts a constant force $F_R$ on the slide 25.

This straight part thus compensates the tolerance-exposed position of the frictional point (synchronizing point) of the synchronizing device on the track follower T, whilst at the same time ensuring a constant force $F_R$ on the slide 25.

Figure 3D:
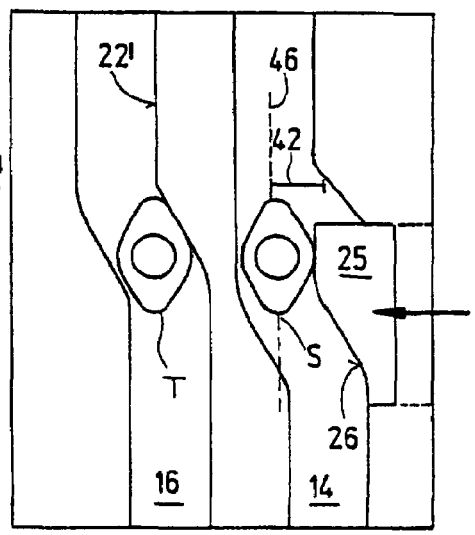

The situation illustrated in FIG. 3c is followed directly by a situation, such as illustrated in FIG. 3d. The shift drum according to the invention has rotated once again slightly along the direction of the arrow 13'. The gear holding force is lower than or equal to the gear pretension force due to the spring, so that the start gear can be disengaged and, if necessary, displaced into a neutral position 46. In this case, the slide 25 is again in its neutral position. The restoring force $F_R$ accumulated by the spring has been used for disengaging the start gear and thus returns to the initial value again.

At the same time point, the target gear or its track follower T remains at the synchronizing point at which the target gear to be engaged receives a drive torque.

Subsequently, during the further rotation of the drum, the track follower T of the target gear is displaced completely in the axial direction, to the left in FIG. 3d, due to the guidance along the flank 22' of the second circumferential track 16, in order to engage the target gear completely.

Figure 3E:
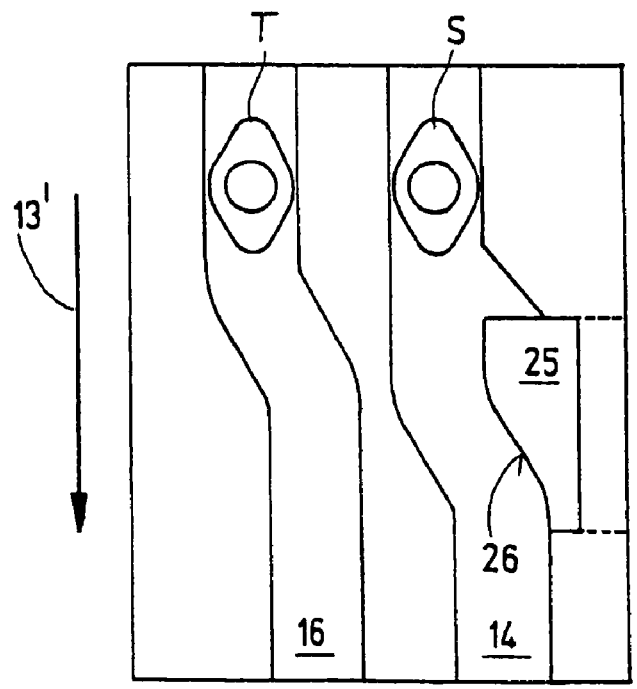

FIG. 3e shows the situation in which the start gear is disengaged completely and the target gear is engaged completely.

Figure 4:
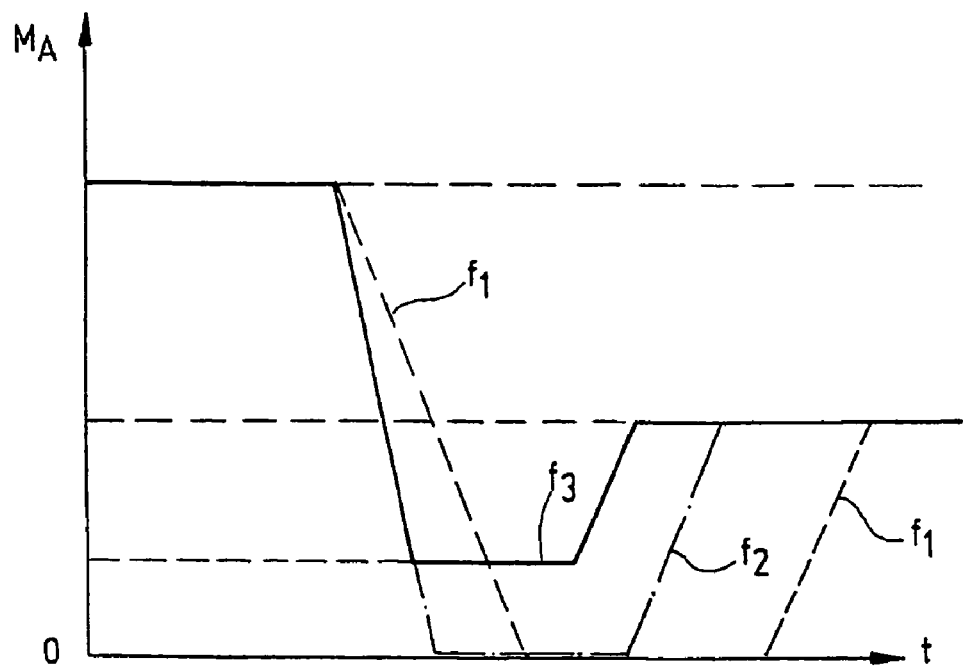
FIG. 4 shows a graph, in which a drive torque prevailing on the output side of the transmission is plotted with respect to time.

FIG. 4 shows a graph in which the drive torque $M_A$ located on the transmission-output side is plotted against the time t. Three curves $f_1$, $f_2$ and $f_3$ are shown in the graph of FIG. 4.

The curve $f_1$ (dashed line) shows a shift operation with a purely sequential shift succession, with the main clutch completely open. The force build-up to disengage the start gear takes place after the complete opening of the main clutch. The approach to the synchronizing point of the target gear takes place after the complete disengagement of the start gear. This reflects a shift with an interruption in traction force.

The curve $f_2$ (dashed and dotted line) shows a shift operation with an overlapping/parallel executed shift succession, with the main clutch completely open. The force build-up for disengaging the start gear takes place before the complete opening of the main clutch. The start gear is thus disengaged under pretension. The approach to the synchronizing point of the target gear happens during the complete disengagement of the start gear and during the complete opening of the main clutch. A shift with a reduced interruption in traction force is thus obtained.

The curve $f_3$ (unbroken line) shows a shift operation with an overlapping/parallel executed shift succession, with the main clutch not open or not completely open. The force build-up for disengaging the start gear takes place with the main clutch not open or not completely open. This means that the start gear is disengaged under pretension. The approach to the synchronizing point of the target gear and the build-up of a supporting/transitional torque for the target gear take place during the preloading of the start gear. The main clutch is therefore at no time open completely. A shift with traction force assistance takes place.

The shift drum according to the present invention thus allows shift operations which are illustrated by the curves $f_1$, $f_2$ and $f_3$ in FIG. 4.

Figures 5A, 5B:
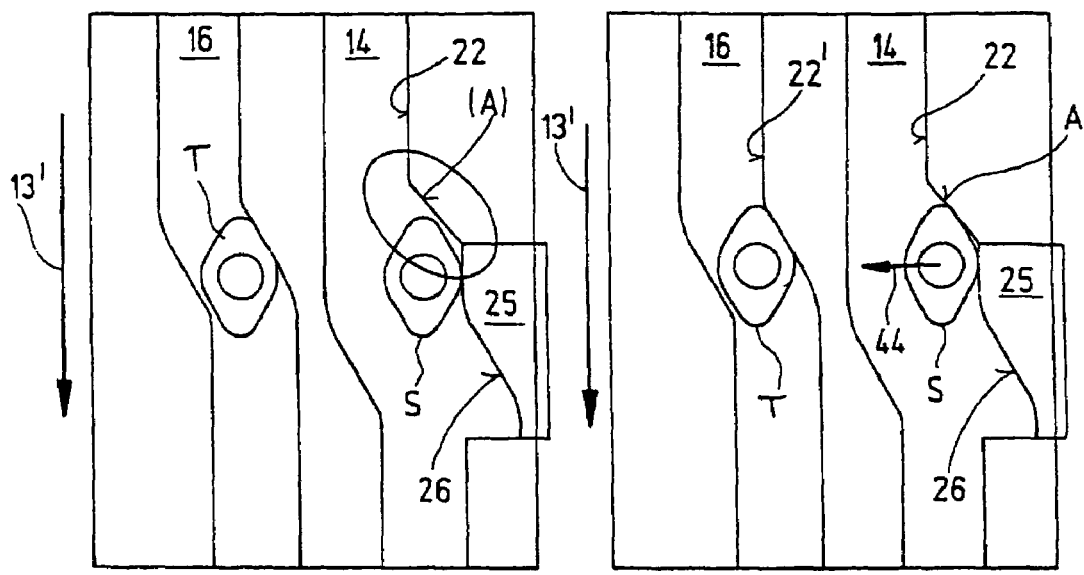
FIGS. 5a-5d show a shift operation similar to FIG. 3, attention being drawn to a safety device which is activated in the event of a malfunction.

FIG. 5 shows an alternative embodiment of the shift drum according to the invention by means of a further shift operation which is illustrated in detail in FIGS. 5a to 5b.

The shift drum according to the embodiment shown in FIG. 5 differs from the shift drum of FIGS. 1 and 2 in that the circumferential track 14 which comprises the movable slide 25 has a so-called ejection flank A. The ejection flank A is part of the flank 22 of the circumferential track 14. The ejection flank A follows the movably mounted flank portion 26 or the rectilinear region of the flank portion of the slide 25 and is in the region of the shift tooth. The ejection flank A serves for activating an emergency disengagement of the start gear in the event of a failure or malfunction of the slide 25.

So as not to damage nor destroy the transmission, two gears should never be engaged simultaneously. The ejection flank A ensures that the start gear is necessarily ejected automatically before the target gear can be engaged.

FIG. 5a shows a state in which the slide 25 has a malfunction. The slide 25 has, admittedly, been moved out of its normal position into the position from which return normally takes place due to the accumulated restoring force (cf. FIG. 3d). Due to damage, for example to the spring element (not illustrated), however, here the restoring force is either not accumulated or is not triggered.

However, since the shift drum is moved further in the direction of rotation 13', but the start gear is still not yet disengaged, the track follower S moves in the direction of the ejection flank A, as illustrated in FIG. 5b. The ejection flank A, designed in the manner of a shift tooth, then has the effect that the track follower S moves along the direction of an arrow 44. The arrow 44 points into the direction of the disengaged state of the start gear.

Furthermore, it can be seen, in FIG. 5b, that the track follower T of the target gear is located (spatially) at the start of the shift tooth in the second circumferential track 16. Because of the flank 22' of the circumferential track 16, the track follower T is forced along the direction of the engaged state of the target gear.

Figures 5C, 5D:
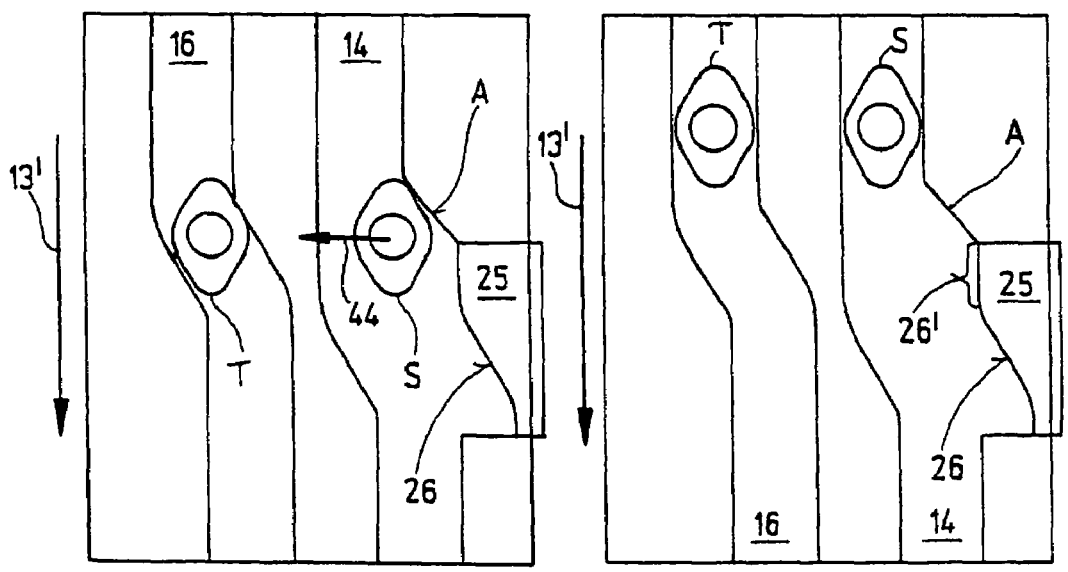

In FIG. 5c, the shift drum has moved a little further on in the direction of the arrow 13'. Because of the ejection flank A, the track follower S of the start gear is moved in the direction of the arrow 44, i.e. it is disengaged. At the same time, the track follower T of the target gear is also moved along the direction of the arrow 44 in order to be engaged.

FIG. 5d shows a state in which the start gear is disengaged and the target gear is engaged. The ejection flank A has caused the start gear to be disengaged just still in good time before the target gear has been engaged.

The shift drum thereby comprises a safeguard with respect to a simultaneous engagement of two gears.

As may be gathered from FIG. 5d, the flank portion 26 of the slide 25 has a plateau region 26' running rectilinearly in the circumferential direction.

The plateau region 26' serves preferably for the compensation of tolerances. The position of the synchronizing point of the target gear will vary due to wear phenomena. Since the plateau region 26' extends over a certain length in the circumferential direction, a rotary-angle range having the same disengageion forces thus is obtained, within which the synchronizing point of the target gear is allowed to vary.

The flank portion 26 is preferably bevelled in the axial direction, as is evident from FIGS. 3 and 5. The bevel has the effect that the movement of the track follower S in the circumferential direction of the movement shift drum in the circumferential direction causes a movement of the slide 25 in the axial direction. The axial movement of the slide 25 causes the restoring force, required for preloading, to be generated.

What is claimed is:

1. Shift drum for a step transmission of a motor vehicle, being mounted rotatably and having at least one circumferential track, into which at least one axially displaceable track follower can engage, said circumferential track having flanks along which said track follower is guided axially when said shift drum is rotated, wherein one of said flanks has a flank portion which is mounted so as to be movable axially by said track follower out of a normal position, in which said flank portion is not moved axially by said track follower, against a restoring force, which is generated when said track follower is guided along said flank portion, wherein another flank portion of said circumferential track, which follows said movably mounted flank portion when said shift drum is rotated further, is formed as an ejection portion.

2. Shift drum according to claim 1, wherein said circumferential track is a circumferential groove.

3. Shift drum according to claim 1, wherein said restoring force, having an arbitrary characteristic curve, increases with an increasing axial movement out of said normal position, of said movably mounted flank portion.

4. Shift drum according to claim 1, wherein, in said normal position, said flank portion projects with respect to said one of said flanks to which said flank portion is assigned.

5. Shift drum according to claim 1, wherein said circumferential track has at least one shift tooth by means of which a change of gear of said step transmission can be caused, said movably mounted flank portion substantially being arranged spatially within a region of said shift tooth.

6. Shift drum according to claim 5, wherein said movably mounted flank portion is formed as a shift-tooth flank.

7. Shift drum according to claim 1, wherein said circumferential track is widened axially within a region of said movably mounted flank portion.

8. Shift drum according to claim 1, wherein said movably mounted flank portion is assigned to a slide, said slide being assigned to a restoring force generator.

9. Shift drum according to claim 8, wherein said restoring force generator comprises a spring.

10. Shift drum according to claim 9, wherein a spring constant of said spring is selected such that said spring can absorb at least a force which is required for an axial movement of said track follower, in order to disengage an engaged gear of said step transmission, in particular under part-load.

11. Shift drum according to claim 8, wherein said restoring force generator is a spring damping system which generates restoring forces of different size as a function of shift time.

12. Shift drum according to claim 8, wherein said restoring force generator is provided internally to said shift drum.

13. Shift drum according to claim 8, wherein said restoring force generator is provided externally to said shift drum.

14. Shift drum according claim 1, wherein said restoring force can be actively regulated via a further control element.

15. Shift drum according to claim 1, wherein said movably mounted flank portion has a plateau region.

16. Shift drum according to claim 1, wherein said movably mounted flank portion is formed such that, at the latest when a gear to be engaged reaches its synchronizing point, said restoring force of said gear to be disengaged is sufficiently high to disengage said gear to be disengaged.

17. Shift drum according to claim 1, wherein said movably mounted flank portion is formed such that it is partially bevelled in said axial direction.

18. Step transmission for a motor vehicle having a shift drum, said shift drum having at least one circumferential track into which at least one axially displaceable track follower can engage, said circumferential track having flanks along which said track follower is guided axially when said shift drum is rotated, wherein one of said flanks has a flank portion which is mounted so as to be movable axially by said track follower out of a normal position, in which said flank portion is not moved axially by said track follower, against a restoring force, which is generated when said track follower is guided along said flank portion, wherein another flank portion of said circumferential track, which follows said movably mounted flank portion when said shift drum is rotated further, is formed as an ejection portion.

19. Method for disengaging a gear in a step transmission of a motor vehicle, comprising the following steps:

rotating a shift drum of said step transmission, said shift drum having at least one circumferential track for engagement and disengagement of a gear of said step transmission into which at least one axially displaceable track follower engages, said circumferential track having flanks along which said track follower is axially guided when said shift drum is rotated, and wherein one of said flanks has a flank portion which is mounted so as to be movable in an axial direction by said track follower out of a normal position, in which said flank portion is not axially moved, against a restoring force, which is generated by an axial movement of said track follower against said flank portion, said flank portion being configured to disengage said gear;

building up said restoring force for disengaging said gear in response to said flank portion moving in said axial direction and said shift drum rotating; and moving said flank portion in a direction opposite said axial direction using said restoring force.

* * * * *

UNITED STATES PATENT AND TRADEMARK OFFICE
CERTIFICATE OF CORRECTION

PATENT NO.         : 7,363,834 B2
APPLICATION NO.    : 11/454611
DATED              : April 29, 2008
INVENTOR(S)        : Stefan Kapp et al.

It is certified that error appears in the above-identified patent and that said Letters Patent is hereby corrected as shown below:

On the Title page, Item [73] (Assignee), line 2, Delete "Herman" and insert -- Hermann --, therefor.

Title page, Item [30], Delete "DE 103 61 536.0" and insert -- DE 103 61 356.0 --, therefor.

In Col. 1, line 47, Delete "an" and insert -- a --, therefor.

In Col. 3, line 66, Delete "whereinin" and insert -- wherein in --, therefor.

In Col. 12, line 35 (approx.), Delete "disengageion" and insert -- disengaging --, therefor.

In Col. 14, line 6, In Claim 18, after "track" insert -- , --.

Signed and Sealed this

Eighteenth Day of November, 2008

JON W. DUDAS
*Director of the United States Patent and Trademark Office*